(12) United States Patent
Abdul-Rasool et al.

(10) Patent No.: US 9,441,555 B2
(45) Date of Patent: Sep. 13, 2016

(54) METHOD AND SYSTEM FOR A VEHICLE

(75) Inventors: Mustafa Abdul-Rasool, Järfälla (SE);
Oskar Johansson, Stockholm (SE);
Mikael Ögren, Norsborg (SE)

(73) Assignee: SCANIA CV AB (SE)

( * ) Notice: Subject to any disclaimer, the term of this patent is extended or adjusted under 35 U.S.C. 154(b) by 485 days.

(21) Appl. No.: 14/118,914

(22) PCT Filed: Jun. 7, 2012

(86) PCT No.: PCT/SE2012/050605
§ 371 (c)(1),
(2), (4) Date: Nov. 20, 2013

(87) PCT Pub. No.: WO2012/169960
PCT Pub. Date: Dec. 13, 2012

(65) Prior Publication Data
US 2014/0114553 A1   Apr. 24, 2014

(30) Foreign Application Priority Data

Jun. 10, 2011   (SE) ........................................ 1150527

(51) Int. Cl.
*B60W 30/18* (2012.01)
*F02D 35/00* (2006.01)
(Continued)

(52) U.S. Cl.
CPC .............. *F02D 29/02* (2013.01); *B60W 10/02* (2013.01); *B60W 10/06* (2013.01); *B60W 10/11* (2013.01);
(Continued)

(58) Field of Classification Search
CPC ...... F02D 29/00; F02D 29/02; F02D 31/007; F02D 35/00; F02D 35/007; B60W 30/18072; B60W 2030/1809; B60W 2030/18081; B60W 2550/142; B60W 2550/143; B60W 2550/402; B60W 2710/0655; B60W 2720/10
USPC .......... 477/175, 84; 701/93, 96, 94; 180/170
See application file for complete search history.

(56) References Cited

U.S. PATENT DOCUMENTS 4,842,113 A * 6/1989 Lutz ...................... B60W 10/06
477/73
7,223,204 B2 * 5/2007 Steen ...................... B60K 17/26
477/97

(Continued)

FOREIGN PATENT DOCUMENTS

DE   10 2008 061 392 A1   2/2010
DE   10 2009 057 393 A1   6/2011

(Continued)

OTHER PUBLICATIONS

Japanese Office Action, dated Sep. 2, 2014, issued in corresponding Japanese Patent Application No. 2014-514838. English Translation. Total 3 pages.

(Continued)

*Primary Examiner* — Hung Q Nguyen
*Assistant Examiner* — George Jin
(74) *Attorney, Agent, or Firm* — Ostrolenk Faber LLP (57) ABSTRACT

A method for running of a vehicle having a combustion engine which can selectively be connected to a driveshaft (104, 105) for propulsion of the vehicle, the vehicle can be run in a first mode (M1) with the engine connected to the driveshaft (104, 105) and in which fuel supply to the engine is substantially shut off, in a second mode (M2) with the engine disconnected from the driveshaft (104, 105) and a third mode like the first mode, but with the fuel supply not cut off. On a downgrade, determining whether running in the first mode (M1) will result in a speed increase, and then running in the second mode (M2) if running it in the first mode (M1) would cause a speed increase.

21 Claims, 6 Drawing Sheets (51) Int. Cl.
- *F02D 29/02* (2006.01)
- *B60W 10/02* (2006.01)
- *B60W 10/06* (2006.01)
- *B60W 10/11* (2012.01)
- *B60W 50/00* (2006.01)
- B60W 30/14 (2006.01)
- B60W 40/076 (2012.01)
- B60W 40/10 (2012.01)

(52) U.S. Cl.
CPC .... *B60W 30/18072* (2013.01); *B60W 50/0097* (2013.01); *B60W 30/143* (2013.01); *B60W 40/076* (2013.01); *B60W 40/1005* (2013.01); *B60W 2030/1809* (2013.01); *B60W 2030/18081* (2013.01); *B60W 2550/142* (2013.01); *B60W 2550/143* (2013.01); *B60W 2550/402* (2013.01); *B60W 2710/0655* (2013.01); *B60W 2720/10* (2013.01); *Y02T 10/84* (2013.01)

(56) References Cited

U.S. PATENT DOCUMENTS

| | | | | |
|---|---|---|---|---|
| 8,521,379 | B2* | 8/2013 | Wurthner | B60W 10/06 477/107 |
| 2004/0138027 | A1* | 7/2004 | Rustige | B60W 10/02 477/175 |
| 2010/0250075 | A1* | 9/2010 | Suzuki | B60W 10/06 701/55 |
| 2010/0324790 | A1* | 12/2010 | Wurthner | B60W 10/02 701/54 |
| 2011/0015037 | A1* | 1/2011 | Koenig | B60W 10/115 477/121 |
| 2011/0130939 | A1 | 6/2011 | Hartmann et al. | 701/93 |
| 2011/0165992 | A1* | 7/2011 | Ueno | B60K 6/365 477/9 |
| 2012/0157262 | A1* | 6/2012 | Bastian | B60W 10/06 477/182 |
| 2013/0116089 | A1* | 5/2013 | Wegner | G05D 13/04 477/110 |
| 2013/0211686 | A1* | 8/2013 | Shono | B60K 6/445 701/70 |

FOREIGN PATENT DOCUMENTS

| | | |
|---|---|---|
| JP | 2003-083130 | 3/2003 |
| KR | 1020040002765 | 1/2004 |
| KR | 1020100011583 | 2/2010 |
| WO | WO 2008/094114 A1 | 8/2008 |

OTHER PUBLICATIONS

International Search Report mailed Oct. 17, 2012 in corresponding PCT International Application No. PCT/SE2012/050605.

Korean Office Action, dated Jul. 20, 2015, issued in Korean Patent Application No. 10-2014-7000677. English translation. Total 8 pages.

* cited by examiner

METHOD AND SYSTEM FOR A VEHICLE

CROSS-REFERENCE TO RELATED APPLICATIONS

The present application is a 35 U.S.C. §§371 national phase conversion of PCT/SE2012/050605, filed Jun. 7, 2012, which claims priority of Swedish Application No. 1150527-8, filed Jun. 10, 2011, the contents of which are incorporated by reference herein. The PCT International Application was published in the English language.

FIELD OF THE INVENTION

The present invention relates to a method and a system for running a vehicle in situations where a reduced power requirement for propulsion of said vehicle prevails. The present invention relates also to a vehicle and to a computer program and a computer program product which implement the method according to the invention.

BACKGROUND TO THE INVENTION

In the running of heavy vehicles, e.g. trucks, buses and the like, vehicle economics have over time increasingly affected the profitability of the activity in which the vehicle is used. As well as the vehicle's procurement costs, the main items of expenditure involved in routine operation comprise driver pay, repair and maintenance costs and fuel to power the vehicle. It is therefore important to keep the costs involved in each of these areas as low as possible.

Depending on the type of vehicle, the significance of different factors may vary but fuel consumption is generally a major item of expenditure. The capacity utilisation of heavy vehicles is often high, resulting in high overall fuel consumption, so any means of reducing fuel consumption is likely to have positive effects on profitability.

Heavy vehicles in general have many different power train configurations, but since it is often desirable for vehicle running to be as comfortable as possible for the driver, automatically operated gearboxes are often used whereby decisions about gear changes and their actual implementation can be controlled by means of an on-board control system.

The fact that automatic gear changing in heavy vehicles is thus usually controlled by a control system makes it possible, is often utilised, to employ a mode of control whereby engine and gearbox control are partly based on commands from the vehicle's driver but wherein control and, for example, gear choice are also largely governed by the control system. For this reason, functions are often incorporated in the control system for improving fuel consumption by wherever possible running the vehicle as fuel economically as possible. These functions may for example take the form of functions for effecting gear changes and gear choice.

Another example of such a function is one whereby on downgrades the vehicle's engine is disconnected from its tractive wheels when the need to provide torque for maintaining the vehicle's speed is reduced. The vehicle's power train is closed again subsequently, e.g. when the driver presses an accelerator pedal or brake pedal.

SUMMARY OF THE INVENTION

The object of the present invention is to propose a method for running a vehicle which solves the above problem.

The present invention relates to a method for running a vehicle having a combustion engine, wherein said engine can selectively be connected to at least one driveshaft to deliver tractive force to said driveshaft in order to propel said vehicle, said vehicle can be run in a first mode in which said engine is connected to said driveshaft and fuel supply to said engine is substantially shut off, and in a second mode in which said engine is disconnected from said at least one driveshaft. In a situation where the vehicle is or will be travelling downhill, the method comprises:

determining whether running said vehicle in said first mode on said downgrade will result in a speed increase for said vehicle, and running the vehicle in said second mode if it is determined that running in said first mode would result in a speed increase for said vehicle.

This affords the advantage that the vehicle's fuel consumption can be further reduced as compared with the reduction previously achieved by prior art. According to the present invention, this is done by disconnecting the engine from the vehicle's tractive wheels (driveshaft or driveshafts) even in situations where it has previously been considered obvious that the vehicle should be run with said engine connected to said driveshaft without fuel supply.

Although in many cases a conventional disconnecting function works well, the inventors of the present invention have found that there are situations in which the fuel consumption of a vehicle powered by a combustion engine can be further reduced on downgrades, which is thus achieved by means of a system as above.

As will be explained below, it is from a fuel economy perspective more advantageous to run a vehicle with the power train open even in situations where the vehicle will accelerate even when the engine is connected to the vehicle's tractive wheels while at the same time the fuel supply is shut off.

The present invention does however result in still lower fuel consumption. The reason is that the fuel required to keep a disconnected engine running is counterbalanced by the fact that with the engine disconnected the vehicle can travel for a longer distance beyond the end of a downgrade. This is partly because the vehicle will reach a higher speed downhill with its engine disconnected than with the engine connected to said driveshaft but no fuel supply.

In addition, the force which counteracts the vehicle's movement will be smaller when the engine is disconnected from the driveshaft (because of there being no engine braking force to counteract the vehicle's forward movement), which means that the vehicle will retard less quickly when it reaches the end of the downgrade. This in turn means that in cases where the vehicle at the end of a downgrade is moving faster than, for example, a set cruise control speed, it can travel a longer distance after the end of the downgrade before its speed drops to the set speed and the power train is therefore closed (connecting the engine to said at least one driveshaft) to cause the engine to provide the vehicle with tractive force in the direction of travel, resulting in reduced fuel consumption.

According town embodiment of the present invention, the vehicle is run in such a way that its engine is always disconnected from the tractive wheels when the vehicle reaches the end of a downgrade, at least so long as the vehicle's prevailing speed is above a set speed. This means that even if for any reason the vehicle is travelling with the engine connected to the tractive wheels at the end of the downgrade, the power train will be opened, since this results in lower fuel consumption up to the location where the vehicle's freewheeling speed drops to the set speed. According to an embodiment, the vehicle's speed after a downgrade is allowed to drop to below said set speed before the power train is again closed.

Further characteristics of the present invention and advantages thereof are indicated by the detailed description of embodiment examples set out below and the attached drawings.

DETAILED DESCRIPTION OF EMBODIMENTS

Figure 1A:
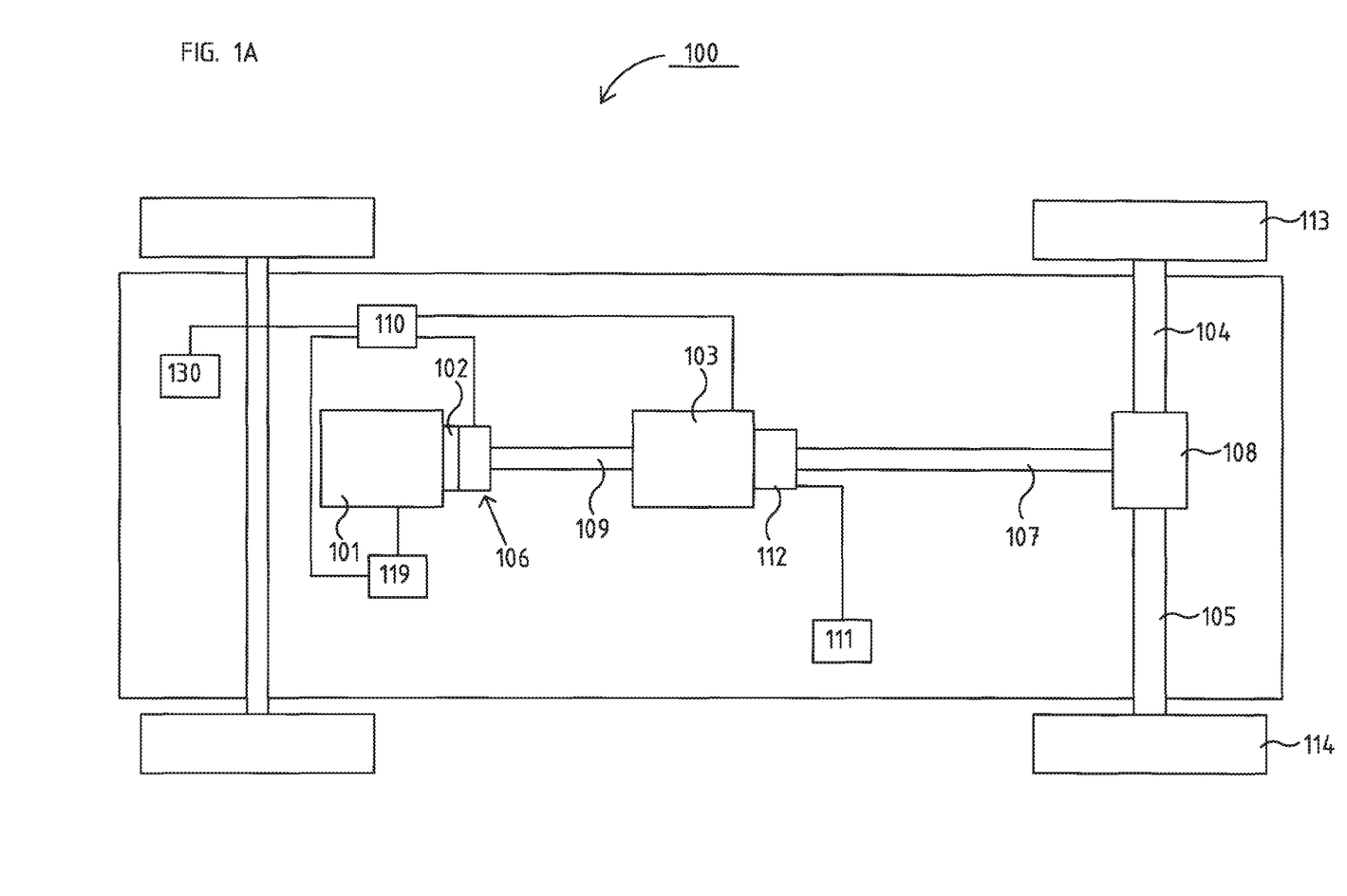
FIG. 1A depicts a power train in a vehicle in which the present invention may be used.

FIG. 1A depicts schematically a power train in a vehicle 100 according to an embodiment of the present invention. The power train comprises a combustion engine 101 which in a conventional way is connected, via an output shaft of the engine, usually via a flywheel 102, to an input shaft 109 of a gearbox 103 via a clutch 106. The clutch may for example take the form of an automatically controlled clutch and be controlled by the vehicle's control system via a control unit 110. The control unit 110 controls also the gearbox 103. The vehicle 100 further comprises driveshafts 104, 105 which are connected to the vehicle's tractive wheels 113, 114 and are driven by an output shaft 107 from the gearbox 103 via an axle gear 108, e.g. a conventional differential.

The vehicle 100 further comprises various different brake systems, e.g. a conventional service brake system (not depicted). The service brake system is controlled by the vehicle's control system by means of a brake control unit 111 which in a conventional way sends signals to, for example, the regulator or regulators which regulate the braking force in the service brake system.

The brake control unit 111 may also be adapted to controlling other brake systems on board the vehicle as well as the vehicle's service brake system. Heavy vehicles are often provided with further brake systems, e.g. in the form of conventional retarders 112 and/or other supplementary brake systems such as various kinds of exhaust brake systems, electromagnetic brake systems and engine brakes. On the basis of commands initiated by the vehicle's driver and/or other control units, the control unit 111 (or some other suitable control unit) sends control signals to suitable system modules to demand desired braking force from desired brake systems. Supplementary brake systems may also be controlled directly by the driver, e.g. via buttons or pedals, in which case the pedal or lever may be directly connected to another control unit which sends information to, for example, a retarder control unit.

Control systems in modern vehicles generally comprise a communication bus system consisting of one or more communication buses for connecting together a number of electronic control units (ECUs), or controllers, and various components onboard the vehicle. Such a control system may comprise a large number of control units and the responsibility for a specific function may be divided between two or more of them. Vehicles of the type here concerned are therefore often provided with significantly more control units than depicted in FIG. 1A, as one skilled in the art will surely appreciate.

According to an embodiment of the present invention, the vehicle is also provided with a control unit 130 in which a look-ahead function for using, for example, a so-called "look ahead" cruise control (LACC) is implemented. LACC is a cruise control which uses knowledge of road sections ahead (knowledge of the nature of the road ahead of the vehicle) for determinations according to the invention. Knowledge of the road section ahead may for example comprise prevailing topology, road curvature, traffic situation, condition of road and speed limitations for the section ahead, and also traffic signs adjacent to the road.

These data may for example be obtained on the basis of positioning information, e.g. in the form of information from suitable positioning and/or navigation systems such as a satellite navigation system, e.g. GPS (global positioning system) information, map information and/or topographical map information. Weather reports may also be used when for example strong tail/headwinds might affect the tractive force required for the vehicle's propulsion.

In the embodiment depicted, the present invention is implemented in the control unit 110 but might also be implemented wholly or partly in one or more other control units already on board the vehicle or a control unit dedicated to the present invention. The control exercised by the control unit 110 over the gearbox 103 is also likely to depend not only upon, for example, an engine control unit 119 but also upon information received from one or more other control units on board the vehicle.

Control units of the type here concerned are normally adapted to receiving sensor signals from various parts of the vehicle, e.g. the control unit 110 may receive sensor signals from the gearbox 103 and signals from, for example, the retarder 112 and the engine control unit 119. Control units of the type here concerned are also usually adapted to delivering control signals to various vehicle parts and components. In the present example, the control unit 111 delivers signals to various control devices to demand desired gear ratios and opening/closing of the clutch 106.

Control is often governed by programmed instructions, typically in the form of a computer program which, when executed in a computer or a control unit, causes the computer/control unit to effect desired forms of control action, e.g. method steps according to the present invention. The computer program usually takes the form of a computer program product 129 which is stored on a digital storage medium 121 (see FIG. 1B), e.g. ROM (read-only memory), PROM (programable read-only memory), EPROM (erasable PROM), flash memory, EEPROM (electrically erasable PROM), a hard disc unit etc., in or connected to the control unit, and which is executed by the control unit. The vehicle's behavior in a specific situation is therefore modifiable by altering the computer program's instructions.

Figure 1B:
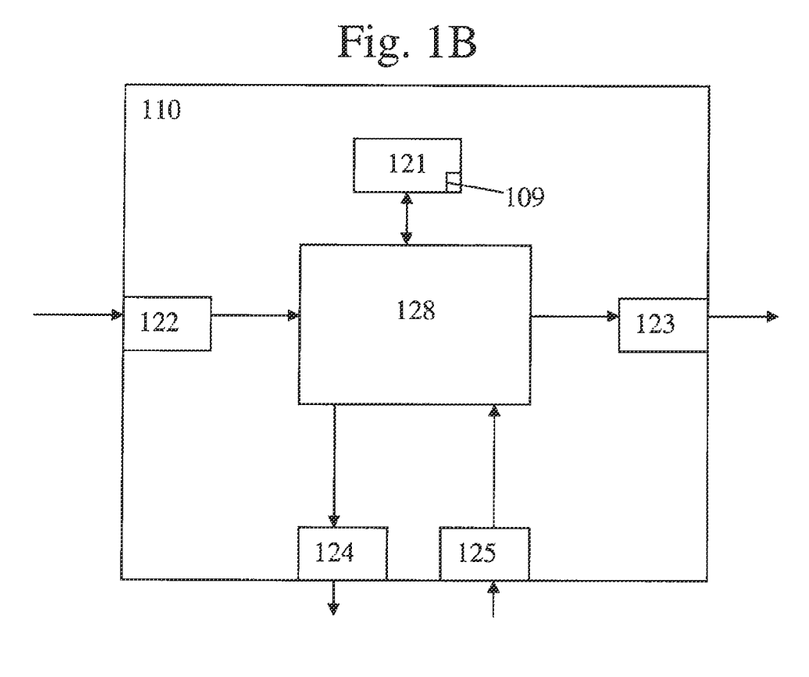
FIG. 1B depicts a control unit in a vehicle control system.

An example of a control unit (the control unit 110) is depicted schematically in FIG. 1B, possibly comprising a calculation unit 128 which may for example take the form of some suitable type of processor or microcomputer, e.g. a circuit for digital signal processing (Digital Signal Processor, DSP), or a circuit with a predetermined specific function (Application Specific Integrated Circuit, ASIC). The calculation unit 128 is connected to a memory unit 121 which provides it with, for example, the stored programme code 129 and/or the stored data which the calculation unit needs for it to be able to perform calculations. The calculation unit 128 is also arranged to store partial or final results of calculations in the memory unit 121.

The control unit is further provided with respective devices 122, 123, 124, 125 for receiving and sending input and output signals. These input and output signals may comprise waveforms, pulses or other attributes which the input signal receiving devices 122, 125 can detect as information and which can be converted to signals which the calculation unit 128 can process. These signals are therefore conveyed to the calculation unit 128. The output signal sending devices 123, 124 are arranged to convert signals received from the calculation unit 128 in order, e.g. by modulating them, to create output signals which can be conveyed to other parts of the vehicle's control system and/or the component/components for which the signals are intended. Each of the connections to the respective devices for receiving and sending input and output signals may take the form of one or more from among a cable, a data bus, e.g. a CAN (Controller Area Network) bus, an MOST (Media Orientated Systems Transport) bus or some other bus configuration, or a wireless connection.

As mentioned above, when the vehicle 100 is in motion, there are situations where it may be advantageous to disconnect the engine 101 from the tractive wheels 113, 114, thereby opening the power train. This disconnection, opening of the power train, may for example be effected by putting the gearbox 103 into neutral or by opening the clutch 106. Disconnecting the engine from the tractive wheels 113, 114 when the vehicle is in motion is referred to below as freewheeling. Previously, freewheeling has only been employed when certain conditions prevail. According to the present invention, freewheeling is also possible in situations where it was previously not employed.

Figure 2:
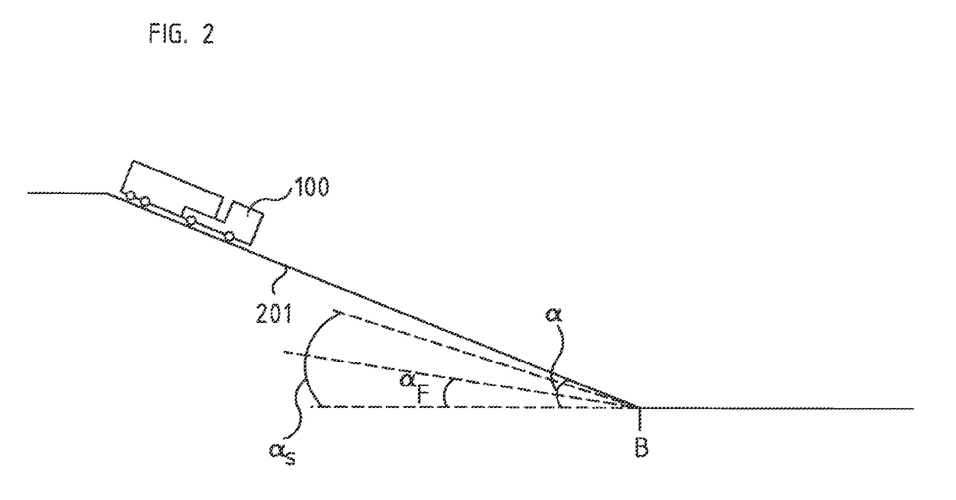
FIG. 2 depicts an example of a downgrade on which the present invention is applicable.

This will now be exemplified with reference to FIG. 2, in which the vehicle 100 is at the beginning of a downgrade 201. In the embodiment depicted the downgrade has a constant gradient $\alpha$. Depending on the magnitude of the angle $\alpha$, the vehicle 100 will be acted upon by a larger or smaller positive force in its direction of travel, i.e. the gradient will cause the force of gravity to exert in the vehicle's direction of travel a positive force component, thereby helping to propel the vehicle and consequently reducing or completely eliminating, depending on the gradient angle, the need for tractive force from the engine 101.

For this reason, as previously mentioned, measures for reducing the vehicle's fuel consumption on downgrades are often adopted. As well as running the vehicle in a freewheeling mode, such a measure takes the form of running it with the power train closed, i.e. with the engine connected to the tractive wheels, while at the same time the fuel supply to the engine is shut off. An advantage of this mode of running the vehicle is that since the fuel supply to the engine is shut off its fuel consumption will also be nil. This measure does however mean that the engine will be driven by the tractive wheels via the power train, a situation known as "dragging", in which the engine's internal losses give rise to a braking force, i.e. the vehicle is engine-braked.

The engine's internal losses are usually related to its speed in such a way that they increase with increased engine speed, and hence too the engine braking force, so dragging is usually conducted with as high a gear as possible engaged in the gearbox (i.e. in as low a gear ratio as possible) to reduce the engine's speed, and hence also its losses, during dragging.

In the case of freewheeling, however, the tractive wheels are not subject to any engine braking effect, which means that the vehicle will roll more easily downhill and thereby also reach a higher speed at the end of a downgrade as compared with dragging. This speed increase is however achieved at the cost of the fuel consumption required to keep the engine running at idling speed.

Depending on the magnitude of the gradient angle $\alpha$, the vehicle will behave in different ways when respectively running in a first mode M1 in which the engine is dragged and a second mode M2 in which the vehicle freewheels. If the angle $\alpha$ in FIG. 2 is smaller than an angle $\alpha_F$, the vehicle will retard both when dragging and when freewheeling (although in freewheeling it will not be retarded as much as when dragging). If $\alpha=\alpha_F$, the vehicle will still be retarded when dragging, but its acceleration during freewheeling will be nil, i.e. during freewheeling the vehicle, given a constant gradient with this angle ($\alpha_F$), will maintain the speed it had at the beginning of the downgrade. If the angle subsequently increases to $\alpha>\alpha_F$, the vehicle, with the engine disconnected, will accelerate downhill and therefore reach at the end of the downgrade a speed which exceeds that which it had at the beginning of the downgrade. An increasing angle $\alpha$ will result in greater acceleration when the power train is disconnected, while the retardation during dragging also becomes less and less. If the angle $\alpha$ amounts to $\alpha_S$, which is a larger angle than $\alpha_F$, the vehicle's acceleration during dragging will be nil, i.e. the vehicle will maintain its speed even when dragging. Finally, if the angle $\alpha$ is larger than $\alpha_S$, the vehicle will accelerate both when dragging and when freewheeling.

In prior art, the only situations in which the engine is disconnected from the tractive wheels and the vehicle therefore freewheels have been those which fulfil the condition $\alpha<\alpha_S$, i.e. only on downgrades where acceleration may have been possible when freewheeling but not with the engine dragging. Dragging has been employed if the angle $\alpha$ exceeds $\alpha_S$. This is understandable when dragging also gives rise to acceleration at angles $\alpha>\alpha_S$ while at the same time the fuel consumption, unlike the case of freewheeling, is nil. The inventors of the present invention have found, however, that freewheeling is also advantageous in situations where dragging causes a vehicle speed increase, i.e. even on downgrades where $\alpha>\alpha_S$. The reason for this will now be described with reference to FIGS. 3A-C and method 400 in FIG. 4. Method 400 begins with step 401 determining whether the vehicle has reached, or soon will reach, a downgrade. This determination may be done in various different ways.

Figure 4:
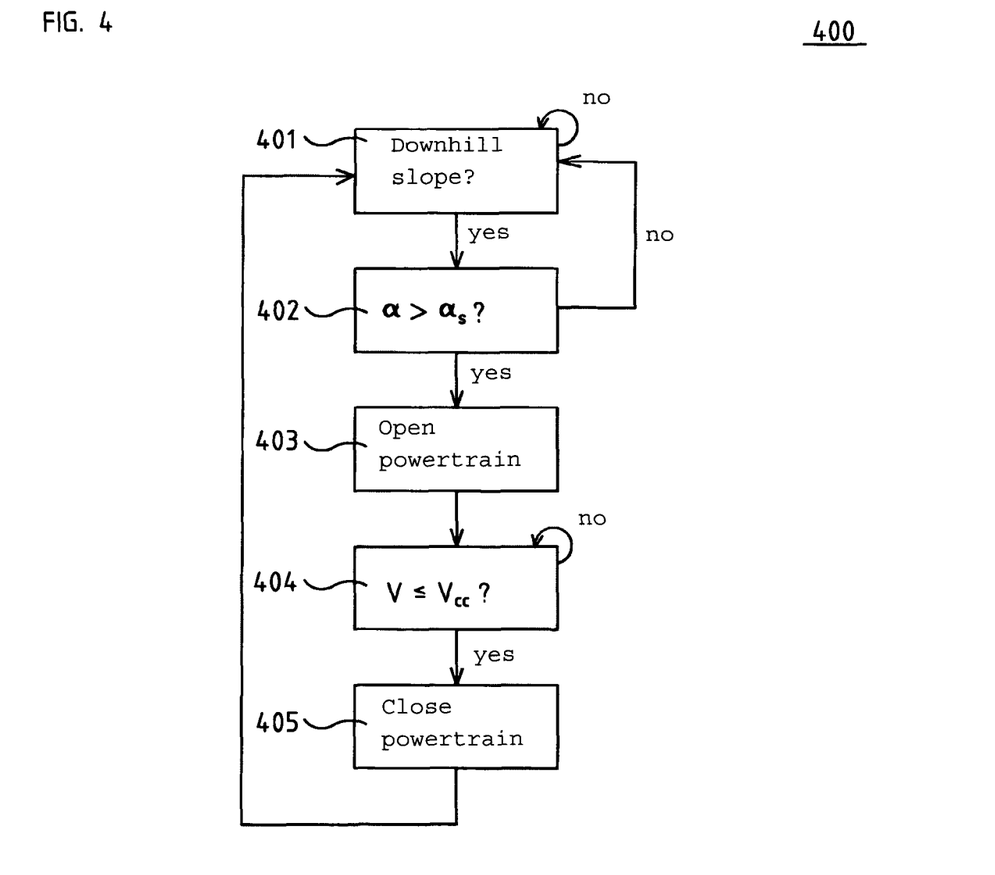
FIG. 4 illustrates an example of a method according to the present invention.

In a first embodiment, determining whether the vehicle has reached a downgrade is based on the forces which affect its movement in the direction of travel. Below, the vehicle's driving force $F_d$ denotes a total representation of the resultant of the forces which act upon the vehicle during operation, i.e. headwind, tailwind, rolling resistance, friction and energy consumers on board, power contribution from the engine and the force of gravity accelerating/braking the vehicle.

This driving force $F_d$ may generally be determined as $$F_d = -F_{air} - F_{rr} + F_{eng} - F_{frict} + F_G \quad \text{eq. (1)}$$

in which:

$F_{air}$ denotes the vehicle's air resistance and may be calculated by its control system by equations which are well described in prior art, on the basis inter alia of the vehicle's speed and cross-sectional area in the direction of movement, although the air resistance force depends on an air resistance coefficient which may be difficult to calculate but may be determined by practical tests. The air resistance may also be estimated by subtracting other counteracting forces as below from the force developed by the engine (which is accessible via the engine control unit). The air resistance coefficient may thus also be estimated. $F_{air}$ works against the vehicle's forward movement, so this force is given a minus sign in equation (1).

$F_{rr}$ denotes the vehicle's rolling resistance force, which is likewise calculated by known equations on the basis of vehicle weight and rolling resistance coefficient. The rolling resistance force is due mainly to the vehicle's tyres/wheels and its prevailing weight. This force likewise works against the vehicle's forward movement, so it too is given a minus sign in equation (1).

$F_{eng}$ denotes the driving force imparted to the vehicle's tractive wheels by its engine. In the above equation this driving force is described as a pushing force, but this is not appropriate to a dragging engine which instead acts negatively upon the propulsive force $F_d$ as a result of the engine's friction. As well as the torque actually delivered by the engine, this force thus comprises the engine's internal losses and also ancillaries which load the engine such as cooling water pump, AC compressor, generator, air compressor and steering servo. With the engine disconnected (freewheeling) $F_{eng}=0$. During dragging, $F_{eng}$ may be expressed as $F_{eng}=F_{engine\_fric}$, in which $F_{engine\_fric}$ will be negative and will therefore work against the vehicle's movement.

$F_{frict}$ denotes not only the gearbox friction, which may be estimated by the vehicle's control system on the basis of knowing the gear position and gearbox temperature (higher temperature normally means less friction) but also friction in rear axle/seals/wheel bearings, which may depend on vehicle speed and may also be stored in the control system. This force likewise works against movement in the vehicle's direction of travel.

$F_G$ denotes the effect of the force of gravity on the vehicle's movement, which may be expressed as $F_G=mg \sin \alpha$, in which m is the vehicle's weight, g the gravitational constant and $\alpha$ the gradient of the vehicle's running surface defined according to the drawings. Depending on the gradient of the running surface, this force will have a positive or negative effect, i.e. on downgrades it will make a positive contribution which reduces the resistance to the vehicle's movement in the direction of travel. As the present invention relates to vehicle movement on downgrades, this force in the present patent application is defined as positive in the vehicle's direction of travel, as emphasised by the definition of the angle $\alpha$ in the drawings.

Knowing the vehicle's speed, the engine's driving torque, the vehicle's configuration and other ambient data makes it possible to calculate the vehicle's driving force $F_d$, which may then also be used to determine whether the vehicle will accelerate or retard. If $F_d$ is positive (defined in the direction of travel) the vehicle will accelerate. There is thus no need for the gradient of the running surface to be determined explicitly, since it is catered for in equation (1). Nor is the angle $\alpha_S$ ($\alpha_F$ etc.) in FIG. 2 constant, since it will in practice be different for different vehicles and even different for the same vehicle, e.g. depending on prevailing cargo weight, which is also covered in the above description of the force of gravity.

Determining whether $\alpha > \alpha_S$ may be done in various different ways.

The driving force $F_d$ may written as $m\dot{v}$, i.e. as the vehicle's weight m multiplied by its acceleration $\dot{v}$. When $F_d$ is positive, it means that $\dot{v}$ is also positive, so the vehicle accelerates, but if $F_d$ is negative the vehicle retards. The vehicle's weight m is usually known to its control system or can usually be determined. The vehicle's acceleration can also be determined by the control system, e.g. by means of an accelerometer.

The force of gravity $F_G$ may also be determined explicitly by determining the current angle $\alpha$ of the vehicle's running surface, e.g. by means of a gradient sensor such as a gyro, or it may, as is usually the case, be estimated by the control unit which controls the vehicle's gearbox.

Determining whether $\alpha > \alpha_S$ as above may thus be done by determining whether the acceleration $\dot{v}>0$, i.e. whether $F_d>0$ in a situation where the fuel supply is shut off with the power train closed.

Knowing the rolling resistance and air resistance and the force of gravity $F_G$ as above, and knowing about $F_{frict}$ likewise as above, makes it possible to determine whether $\alpha > \alpha_S$ by determining whether $-F_{air}-F_{rr}-F_{frict}+F_G>0$. If the result is greater than zero, it means that the vehicle will accelerate when the power train is open, i.e. $\alpha > \alpha_F$.

If the result is also greater than $F_{engine\_fric}$, the vehicle will also accelerate when the power train is closed and the fuel supply is shut off. $F_{engine\_fric}$ may for example be stored in the vehicle's control system, e.g. in the form of a table for different engine speeds. This determination may also cater for the ancillaries driven by the engine at the time, in which case the power required for driving them may also be stored for each of them.

The result is immediate determination of whether $\alpha > \alpha_S$, since such will be the case if $-F_{air}-F_{rr}-F_{frict}+F_G > F_{engine\_fric}$.

If the acceleration and hence $F_d$ (since the vehicle's weight is known) are known, e.g. by accelerometer, the calculation may be further simplified by determining whether $F_d > F_{eng} \cdot F_{eng}$ may for example be determined by converting the driving torque on the engine's output shaft to power, which may be done by means of known mathematical expressions comprising the weight of the vehicle and the radius of the tractive wheels. If $F_d > F_{eng}$ the vehicle will accelerate when freewheeling, i.e. when $\alpha > \alpha_F$. If thereafter $F_d > F_{eng} + F_{engine\_fric}$ the vehicle will also accelerate when dragging, i.e. when $\alpha > \alpha_S$.

It is thus possible to determine whether $\alpha > \alpha_S$ in a straightforward way as above, which may also be done in other ways known to one skilled in the art. If any of the vehicle's brake systems is activated at the time of this determination, the above equations may be compensated for braking force applied, which may be calculated and/or estimated by the brake control unit 111.

If it is found at step 401 that the road on which the vehicle is travelling changes to a downgrade, the method moves on to step 402 to determine whether the downhill gradient is such that $\alpha > \alpha_S$. This may for example be determined as above.

According to the present invention, the gradient angle thus need not be determined specifically, but be replaced by determining a relationship which corresponds to the situation.

If the condition at step 402 is not fulfilled, the method goes back to step 401, but where it is determined at step 402 that the state of the running surface is such that the vehicle will accelerate when dragging the method moves on to step 403, whereupon the power train is opened to run the vehicle in said second mode M2. Switching to said second mode M2 may thus take place substantially immediately after the vehicle reaches said downgrade or substantially immediately after the downgrade becomes such that the gradient $\alpha > \alpha_S$. According to an embodiment of the invention, the vehicle always switches to said second mode M2 as soon as it reaches a downgrade, and according to an embodiment the vehicle always switches to said second mode M2 as soon as the vehicle reaches a downgrade where a is greater than or equal to $\alpha_F$.

Figure 3A:
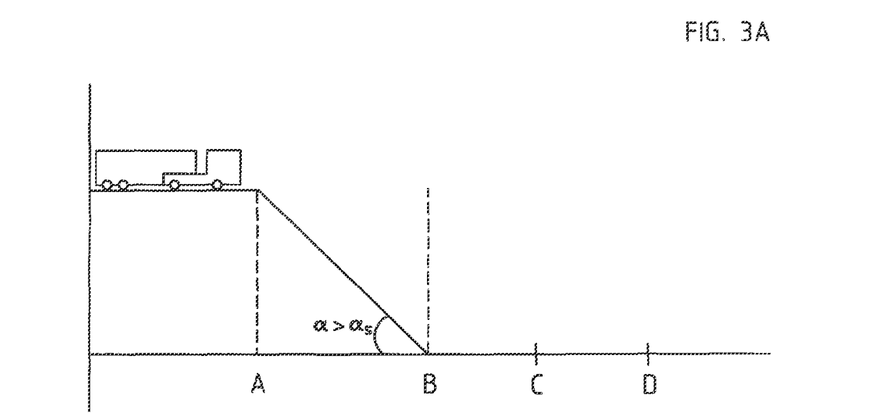
FIG. 3A depicts a vehicle on a downgrade with a gradient such that the vehicle will accelerate both when freewheeling and when dragging.
Figure 3B:
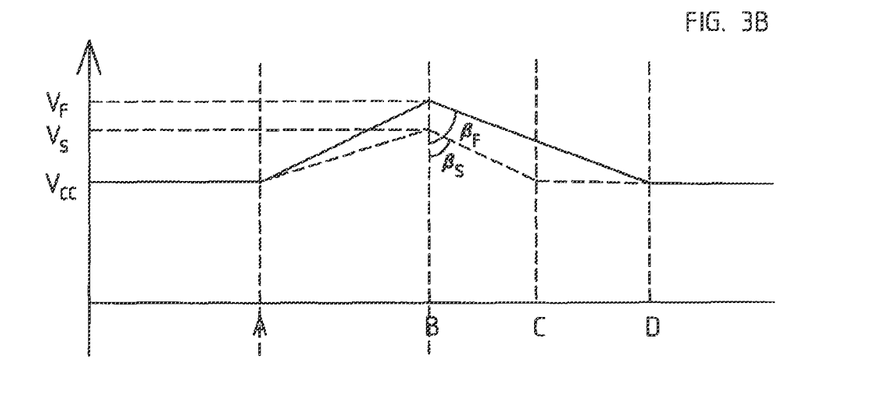
FIG. 3B depicts schematically the vehicle's respective speeds when freewheeling and dragging on the downgrade depicted in FIG. 3A.

FIG. 3A depicts a downgrade which begins at a location A and ends at a location B, so determination according to step 402 and power train opening according to step 403 will take place at or close to location A. FIG. 3B illustrates the changes in the vehicle's speed along the section of road depicted in FIG. 3A, and FIG. 3C its fuel consumption on the same section. Locations A, B, C correspond mutually in FIGS. 3A-C.

As may be seen in FIG. 3B, the vehicle has until it reaches location A a speed $V_{cc}$ which may for example be a set cruise control speed. As may be seen in FIG. 3C, the vehicle's fuel consumption at the time is at a level $C_2$.

When it arrives at location A, thus reaching a downgrade with a gradient angle $\alpha$ which is greater than $\alpha_S$ as above, the vehicle may be run as in prior art, i.e. with the engine dragging, or according to the present invention whereby the vehicle freewheels. These two alternatives are exemplified in FIGS. 3B and 3C, in which continuous lines represent the vehicle freewheeling and broken lines the vehicle dragging. Since the downhill gradient angle is greater than $\alpha_S$, causing the vehicle to accelerate even when dragging, its speed will increase both when dragging and when the engine is disconnected. This is illustrated in FIG. 3B in which the vehicle when dragging reaches the speed $V_S$ at the end of the downgrade, whereas it reaches the higher speed $V_F$ when running with the engine disconnected.

Figure 3C:
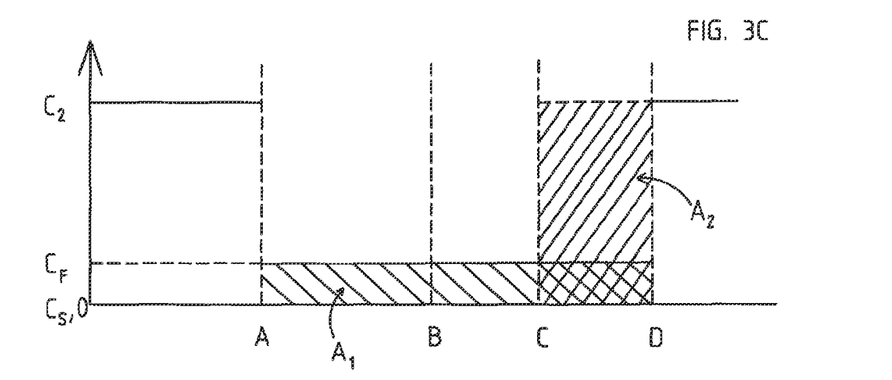
FIG. 3C depicts schematically the respective fuel consumptions of the vehicle depicted in FIG. 3A when freewheeling and dragging.

FIG. 3C illustrates the fuel consumption in both cases, showing that the fuel consumption during dragging, $C_S$, is nil, since no fuel is supplied, whereas the fuel consumption during freewheeling, $C_F$, is the consumption required to keep the engine (and any ancillaries driven by it), e.g. AC compressor, running at idling speed.

When the downgrade ends at location B, the vehicle will stop accelerating and will instead begin to retard. When the vehicle is retarded with the power train closed, its speed will, owing once again to the engine braking effect, decrease more quickly than with the engine disconnected. For the sake of clarity, this is illustrated by angles $\beta_S$, $\beta_F$, such that the angle $\beta_S$ in FIG. 3B is smaller than the angle $\beta_F$. This means in this example that the vehicle's speed has dropped back to $V_{cc}$ already at location C when dragging, whereas in freewheeling its speed does not drop to $V_{cc}$ until it reaches location D. This relatively higher speed which the vehicle reaches when freewheeling may thus be used to continue the vehicle's movement with the engine disconnected past location B in FIG. 2 and location C in FIG. 3B until it has for example dropped to a desired cruising speed at location D. This is represented by step 404 in FIG. 4. At step 405 the power train closes for the vehicle to revert to being propelled by its engine, whereupon the method goes back to step 401 pending another downgrade.

This in turn means that the fuel consumption of the vehicle when dragging will rise back to level $C_2$ at location C, whereas this will not take place until location D when the vehicle has been freewheeling downhill. Thus the vehicle's fuel consumption performance is the same before location A and after location D. This means that freewheeling will be preferable to dragging if the fuel consumption between locations A and D when freewheeling is less than when dragging. This portion of the fuel consumption is represented in FIG. 3C by the respective areas $A_1$ between locations A and D and $A_2$ between locations C and D. It should be noted that areas $A_1$ and $A_2$ partly overlap between locations C and D.

So long as area $A_1$ is smaller than area $A_2$, the vehicle's fuel efficiency will be greater when freewheeling than when dragging. This will also be the case, as explained in more detail below. It should also be noted that the way the respective areas $A_1$ and $A_2$ are depicted in FIG. 3C is not entirely correct with regard to assessing differences in fuel consumption and is actually to the detriment of freewheeling.

When freewheeling, the vehicle will as above reach a higher speed $V_F$ than the speed $V_S$ which is reached during dragging. This also means that a freewheeling vehicle will have a higher average speed between locations A and D than when travelling with the power train closed. As the vehicle when freewheeling will have a higher average speed, it will also travel more quickly between locations A and D, which means that in practice it will run the engine at idling speed for a shorter time than indicated in FIG. 3C, since this drawing illustrates fuel consumption as a function of location and not of time.

For example, the time a dragging vehicle takes to travel from location C to location D will be longer than a freewheeling vehicle, so in practice area $A_2$ in FIG. 3C will also be wider and therefore larger than area $A_1$.

The reason for freewheeling being more advantageous than dragging from a fuel consumption perspective is clear in equation (1) above. As above, equation (1) describes the retarding forces which work against the vehicle's acceleration and have to be overcome by means of engine-generated positive force $F_{eng}$ and/or a positive contribution from the force of gravity $F_G$ downhill if a speed increase in the direction of travel is to be achieved. During dragging, $F_{eng}$, i.e. the force generated by the engine, will be a braking (negative) force due to the engine's internal losses and to any ancillaries being driven by the engine. These losses amount to $F_{engine\_fric}$ as above. During dragging, $F_{eng}$ may as above be expressed as $F_{eng} = F_{engine\_fric}$ in which $F_{engine\_fric}$ will be negative and therefore work against the vehicle's movement. The friction force depends on engine speed and increases with increasing engine speed. This is due partly due to increased pump losses at higher engine speeds, e.g. because pumps, e.g. cooling water pumps, driven by the engine have to do more work at higher engine speeds. The engine's drag torque depends on its internal friction losses which likewise depend on engine speed and constitute the torque required for the engine shaft to rotate at desired speed.

The overall amount of energy lost in terms of kinetic energy during dragging as compared with freewheeling, i.e. $\frac{1}{2}mv_F^2 - \frac{1}{2}mv_S^2$ in which m is the vehicle's weight, will be greater than the amount of energy supplied in fuel to keep the engine running at idling speed, because the friction losses at idling speed are smaller than at the substantially higher speed at which the engine will run when dragging. Owing to the engine losses due to engine speed, the whole of the cost of the fuel required to keep the engine running when it is disconnected will thus be counterbalanced by the higher speed which the vehicle will have at the end of the downgrade, i.e. at location B in FIG. 3A.

According to an embodiment of the present invention, the engine is therefore also always disconnected from the tractive wheels when the vehicle reaches the end of a downgrade, i.e. when it reaches location B, in cases where its prevailing speed exceeds a set speed. In other words, even if the vehicle is dragging when it reaches the end of the downgrade, the engine is disconnected to allow the vehicle's speed to decrease by freewheeling when as above this is preferable from both a fuel consumption perspective and a time perspective.

The present invention thus proposes a method for running the vehicle on downgrades of the kind described above which results in lower fuel consumption than in prior art. The invention also affords the advantage that the vehicle's average speed on downgrades will be higher, which means that the vehicle will reach its destination more quickly or may be run at somewhat lower cruising speed for a period of time, thereby adding time savings and/or further fuel savings to the savings as above.

According to an embodiment of the present invention, the vehicle is run with the engine disconnected not only on downgrades where it would accelerate when dragging, but also on downgrades with smaller gradient angles, e.g. those where the vehicle retards when dragging and/or where it retards even when the engine is disconnected. In cases where the vehicle retards even with the engine disconnected, the freewheeling may be discontinued if for example its speed drops to a lowest desired speed, e.g. $V_{cc}$ minus some suitable offset, in which case the magnitude of said offset may for example depend on the prevailing speed $V_{cc}$.

Figure 5A:
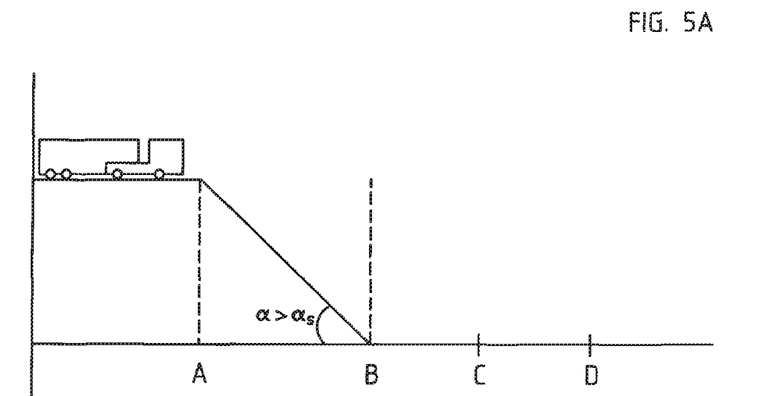
FIG. 5A depicts a vehicle on another downgrade with a gradient such that the vehicle will accelerate both when freewheeling and when dragging.
Figure 5B:
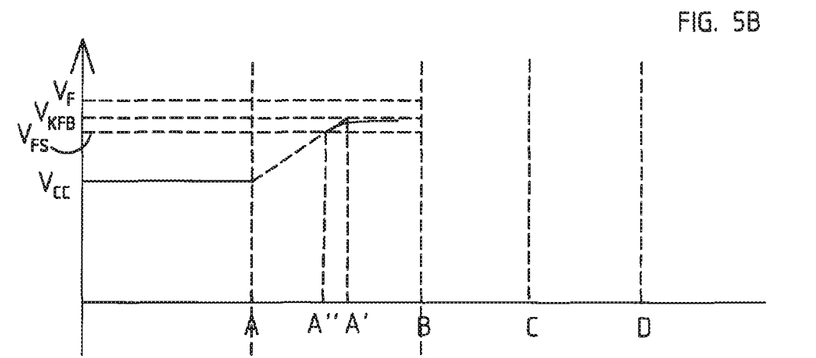
FIG. 5B depicts schematically the vehicle's speed when freewheeling on the downgrade depicted in FIG. 5A.

Although it will often be possible for a vehicle to be run according to a scenario entirely as described above, there are situations where it might, when freewheeling, reach an unacceptably high speed downhill. This is exemplified in FIGS. 5A-B. FIG. 5A depicts the same downgrade as in FIG. 3A. FIG. 5B illustrates the vehicle's speed. As above, the vehicle's speed is $V_{cc}$ when it reaches location A and the downgrade begins. At location A engine is disconnected as above from the tractive wheels, so the vehicle starts freewheeling down the hill. If it freewheeled all the way down in the example depicted, it would as above reach the speed $V_F$ at the end of the downgrade.

The vehicle may however have internal speed restrictions which do not allow the speed $V_F$ to be reached. For example, cruise control functions often use an offset whereby the vehicle's speed is allowed to vary about the set cruise control speed $V_{cc}$. The vehicle's speed may for example be allowed to deviate from $V_{cc}$ by a speed selectable within the range 3-15 km/h. The vehicle may also be subject to a maximum speed not to be exceeded, e.g. because of government regulations, or because the vehicle's manufacturer states a maximum speed. The speed may also be set by the vehicle's driver. This speed is denoted by $V_{KFB}$ in FIG. 5B, and if it is reached the vehicle will automatically begin using supplementary brake systems to ensure that $V_{KFB}$ is not exceeded. In the example depicted in FIG. 5B, the speed $V_{KFB}$ is lower than the speed $V_F$, which in the example depicted would mean that the vehicle begins automatic braking at location A' and be subsequently braked to maintain the speed $V_{KFB}$ for the remainder of the downgrade.

It is generally the case that the risk of the vehicle's speed exceeding any specific maximum permissible speed increases with the length of the downgrade and the amount of acceleration. In other words, the longer and steeper a downgrade is, the greater the likelihood of the vehicle having to be braked.

Such a scenario is not desirable, however, if the vehicle would have reached the speed $V_{KFB}$ even when dragging, since in that case the final speed ($V_{KFB}$) would be the same, but unlike freewheeling the speed would have been reached without fuel consumption during dragging. The embodiment depicted in FIGS. 5A-B therefore involves, when the engine has been disconnected from the tractive wheels, determining whether the vehicle is expected to reach the speed $V_{KFB}$. This determination may either be done immediately, e.g. by means of a look-ahead function as below, or when for example the vehicle has reached a speed $V_{FS}$ which is higher than $V_{cc}$ but lower than $V_{KFB}$.

The vehicle's acceleration may be determined continuously when freewheeling, i.e. a plurality of determinations may be done during the time the vehicle takes to travel from location A to location A', in which case this acceleration determined may be evaluated to determine whether any action should be taken when the speed $V_{FS}$ is reached. If for example it is found at location A" that its acceleration is constant, the vehicle may be expected to reach the speed $V_{KFB}$ within a certain time. For this reason the power train may in this case be closed so that the vehicle runs instead with dragging in order to apply a greater propulsion resistance with consequently reduced acceleration and hence less risk of reaching the speed $V_{KFB}$ (continuous line in FIG. 5B). If at location A" it is determined that the power train should be closed, another determination may be done immediately after the closure, i.e. after location A"', to see whether the power train can be reopened to freewheel again without reaching the speed $V_{KFB}$.

According to an embodiment of the invention, determining whether the power train should be closed may commence immediately after its opening at location A.

In this case it is for example possible instead to make a first choice based on the vehicle's driving force $F_d$ and thereafter continuously calculate the driving force $F_d$ (and/or determine the vehicle's speed) in order when necessary to change the vehicle's propulsion mode downhill.

An example of an embodiment uses a look-ahead (LA) function to determine whether the vehicle has reached or will reach a downgrade. The LA function may for example comprise an on-board database of topography, and hence road gradients, either for all roads within a geographical scope, e.g. a region, country, continent etc., or for the road sections along which the vehicle normally travels. These data are combined with the vehicle's location which may for example be obtained on the basis of location data from a satellite navigation system, e.g. data from a GPS receiver, in which case the vehicle's control system can be aware of the nature of the road ahead of the vehicle and hence also determine that it has reached or will reach a downgrade.

Road gradient data may for example also be sent to the vehicle via some suitable wireless link, in which case data transmitted may for example be controlled by the vehicle's current location. As well as topographical information, road data may also comprise information about speed limits, bends etc. These data may also be used in the determination according to the present invention, e.g. to prevent risk of speed limits being exceeded or of the vehicle entering a bend at unacceptably high speed.

This LA functionality will be implemented in vehicles in the future, and data from the LA function may be sent to the control unit 110 as necessary. Determination by means of LA functionality affords the advantage of making it possible, even before the vehicle reaches a downgrade, to determine that it will soon do so. The LA function may also be used to calculate the highest speed which the vehicle will reach on the basis of knowing its current speed, the downhill gradient ahead and other vehicle data. In the case of on-board LA functionality, freewheeling may commence even before the beginning of the downgrade in order to reduce the vehicle's speed before it increases again downhill. Said vehicle may also be switched to said second mode M2 within a first time t1 from when it is determined that the vehicle's speed would increase when running in said first mode M1. This method may for example be used to ensure that the vehicle's speed downhill will not exceed $V_{KFB}$ as above. The present invention may also be combined with the method and system described in the parallel Swedish patent application entitled "Method and system pertaining to vehicles II", with the same filing data, inventor and applicant as the present application, whereby the vehicle is allowed to freewheel even before it reaches a downgrade.

The above description also describes freewheeling according to a method whereby the engine during freewheeling runs at idling speed, resulting in fuel consumption. According to an embodiment, the engine is switched off when freewheeling.

Switching the engine off results in further reduced fuel consumption as compared with situations where the engine is merely disconnected from the vehicle's driveshafts and situations where the vehicle drags. The engine may be switched off for the whole or one or more parts of the period of time when the vehicle is freewheeling.

According to an embodiment, the engine is only switched off in situations where it is determined that switching off is advantageous. It is for example possible to determine whether the engine may be switched off for a first period of time before having to be restarted. This determination may for example be done by means of a look-ahead function as above. The period of time may for example be based on the fuel saving achieved by switching said engine off and said first period of time may for example be a period which at least results in reduced fuel consumption corresponding to that required for restarting said engine with a starter motor. The parallel Swedish patent application entitled "Method and system pertaining to vehicles III", with the same filing date, inventor and applicant as the present application, describes a method and a system whereby the vehicle's engine is switched off during freewheeling when switching off can be for at least a first period of time. That method may also be applied here.

The present invention is not restricted to the invention's embodiments described above but relates to and comprises all embodiments within the protective scope of the attached independent claims. For example, the present invention is exemplified above for a downgrade with constant gradient α. As previously indicated, the invention is applicable for all types of downgrades, i.e. even those with varying gradients. The essential point of the invention is that the vehicle is allowed to freewheel even in situations where there would also have been acceleration when dragging.

The invention claimed is:

1. A method for running a vehicle, wherein the vehicle comprises a combustion engine and a driveshaft to which the engine can selectively be connected to deliver driving force to the driveshaft for propulsion of the vehicle;
the vehicle is selectively run in a first mode (M1) in which the engine is connected to the driveshaft and a fuel supply to the engine is substantially shut off, and in a second mode (M2), in which the engine is disconnected from the driveshaft;
wherein the vehicle is or will be travelling on a downgrade;
the method comprises:
determining whether running the vehicle on the downgrade in the first mode (M1) will result in a speed increase of the vehicle; and
then running the vehicle in the second mode (M2) if running the vehicle in the first mode (M1) would result in a speed increase of the vehicle.

2. A method according to claim 1, in which the determining is done when the vehicle is run in any from among
the first mode (M1);
the second mode (M2); and
a third mode in which the vehicle is run with the engine connected to the driveshaft while at the same time fuel is supplied to the engine.

3. A method according to claim 1, further comprising the determining of whether running the vehicle on the downgrade in the first mode (M1) will result in a speed increase of the vehicle is by at least one control unit situated in the vehicle's control system.

4. A method according to claim 1, further comprising when whether running the vehicle on the downgrade in the first mode (M1) will result in a speed increase for the vehicle has been determined, switching to running the vehicle in the second mode (M2) immediately after the vehicle has reached the downgrade.

5. A method according to claim 1, further comprising switching the vehicle to the second mode (M2) before the vehicle reaches the downgrade.

6. A method according to claim 1, further comprising switching the vehicle to the second mode (M2) within a first period of time (t1) after it has been determined that the speed of the vehicle would increase if the vehicle is run in the first mode (M1).

7. A method according to claim 1, further comprising running the vehicle in the second mode (M2) even when it has been determined that the speed of the vehicle would decrease if the vehicle is run in the first mode (M1).

8. A method according to claim 1, further comprising determining whether the vehicle is on a downgrade based on forces which affect the vehicle's movement in the direction of travel.

9. A method according to claim 8, further comprising determining whether a driving force requirement for the vehicle is such that the speed of the vehicle will increase if the vehicle is run in the first mode (M1) on the downgrade, by determining whether the resultant of forces which affect the vehicle's movement in the direction of travel exceeds a first value.

10. A method according to claim 1, wherein the determining of whether the vehicle is on or will be on a downgrade is based on control signals to and/or from the engine.

11. A method according to claim 1 further comprising determining whether the vehicle is on or will be travelling on a downgrade, based on data concerning the gradient of the vehicle's itinerary ahead and/or based on data concerning the road topography of the vehicle's itinerary ahead and/or based on the vehicle's location, and the data including data concerning the downgrade.

12. A method according to claim 1, further comprising:
activating a cruise control function for the vehicle when it has been determined whether the vehicle's speed will increase if the vehicle is run in the first mode (M1) on the downgrade.

13. A method according to claim 1, further comprising:
determining whether the vehicle is approaching the downgrade; and
when the vehicle is approaching the downgrade, disconnecting the engine from the driveshaft at a first location on the road before the vehicle reaches the downgrade.

14. A method according to claim 13, further comprising determining the first location based on determining the speed which the vehicle will have when it reaches the downgrade and/or based on determining the speed decrease which the vehicle will undergo from the first location to where the vehicle reaches the downgrade.

15. A method according to claim 1, further comprising when the vehicle is run in the second mode, connecting the engine to the driveshaft when the vehicle's speed differs from a maximum speed ($v_{KFB}$) set for the vehicle by a difference less than a second value and/or when the vehicle's acceleration at a speed ($v_{FS}$), which differs from a maximum speed ($v_{KFB}$) set for said vehicle by less than a second value, exceeds a first acceleration.

16. A method according to claim 1, further comprising switching the engine off for at least part of the period of time when the engine is disconnected from the driveshaft.

17. A computer program product comprising a computer-readable medium and a computer program code contained in the computer-readable medium which, when the program code is executed in a computer, causes the computer to apply the method according to claim 1.

18. A system for running a vehicle, wherein the vehicle comprises a combustion engine and a driveshaft to which the engine may be selectively connected to deliver driving force to the driveshaft for propulsion of the vehicle;
the vehicle is configured to be selectively run in a first mode (M1) in which the engine is connected to the driveshaft, and a device for selectively permitting or shutting off supply of fuel to the engine is operated so that a fuel supply to the engine may be selectively substantially shut off, or the vehicle is configured to run in a second mode (M2) in which the engine is disconnected from the driveshaft;
for a situation where the vehicle is or will be travelling on a downgrade, the system comprises a device configured for determining whether running on the downgrade in the first mode (M1) will result in a speed increase for the vehicle; and
a further device for running the vehicle in the second mode (M2) if it is determined that running the vehicle in the first mode (M1) would result in a speed increase for the vehicle.

19. A system according to claim 18, further comprising a gearbox comprising a plurality of distinct vehicle gears with different respective vehicle gear ratios such that in the first mode (M1), the vehicle is run at a distinct gear ratio in the gearbox.

20. A system according to claim 18, further comprising a device configured for disconnecting the engine from the driveshaft by opening a clutch of the vehicle and/or by putting the gearbox into neutral gear.

21. A vehicle provided with a system according to claim 18.

* * * * *